United States Patent
Wilson et al.

(10) Patent No.: US 7,274,530 B2
(45) Date of Patent: Sep. 25, 2007

(54) LOGICAL MAPPING FOR IMPROVED HEAD SWITCHING BETWEEN CORRESPONDING TRACKS IN A DATA HANDLING DEVICE

(75) Inventors: Nathaniel Boyd Wilson, Edmond, OK (US); Roy Lynn Wood, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 497 days.

(21) Appl. No.: 10/681,964

(22) Filed: Oct. 9, 2003

(65) Prior Publication Data

US 2005/0078566 A1 Apr. 14, 2005

(51) Int. Cl.
*G11B 5/596* (2006.01)
*G11B 5/55* (2006.01)
*G11B 21/02* (2006.01)

(52) U.S. Cl. .................. 360/78.04; 360/75; 360/78.01
(58) Field of Classification Search ............ None
See application file for complete search history.

(56) References Cited

U.S. PATENT DOCUMENTS

| | | | |
|---|---|---|---|
| 5,134,608 A * | 7/1992 | Strickler et al. | 720/662 |
| 5,424,885 A | 6/1995 | McKenzie et al. | |
| 5,455,721 A | 10/1995 | Nemazie et al. | |
| 5,848,438 A | 12/1998 | Nemazie et al. | |
| 5,999,375 A | 12/1999 | Forbord et al. | |
| 6,094,320 A | 7/2000 | Ahn | |
| 6,101,061 A | 8/2000 | Goker | |
| 6,130,796 A | 10/2000 | Wiselogel | |
| 6,239,937 B1 | 5/2001 | Troemel | |
| 6,297,926 B1 | 10/2001 | Ahn | |
| 6,466,385 B1 | 10/2002 | Umeda et al. | |
| 6,483,658 B1 | 11/2002 | Nguyen | |
| 6,493,176 B1 | 12/2002 | Deng et al. | |
| 6,560,055 B1 | 5/2003 | Nemazie et al. | |
| 6,684,287 B1 * | 1/2004 | Ng | 711/4 |
| 2002/0149867 A1 | 10/2002 | Dunn et al. | |
| 2002/0176199 A1 | 11/2002 | Gomez et al. | |
| 2002/0181139 A1 | 12/2002 | Weiehelt et al. | |
| 2003/0002198 A1 | 1/2003 | Subrahamanyan et al. | |
| 2003/0030937 A1 | 2/2003 | Kohso et al. | |
| 2003/0099050 A1 | 5/2003 | Kitagawa | |
| 2003/0112544 A1 | 6/2003 | Harmer et al. | |
| 2003/0112545 A1 | 6/2003 | Hanson et al. | |
| 2004/0136104 A1 * | 7/2004 | Chiao et al. | 360/31 |

* cited by examiner

*Primary Examiner*—William R. Korzuch
*Assistant Examiner*—Daniell L. Negrón
(74) *Attorney, Agent, or Firm*—Fellers, Snider, et al.

(57) ABSTRACT

In a data handling system having a radially-dependent track incongruity between data surfaces, at least some tracks are logically mapped so that tracks on different data surfaces correspond with one another. The correspondence is defined by the mapping so as to shorten an average headswitch seek. For example, a logical track mapping of first and second non-coaxial track sets can be defined so as to optimize a headswitch seek within each of many intermediate logical cylinders identified in the mapping.

17 Claims, 7 Drawing Sheets

LOGICAL MAPPING FOR IMPROVED HEAD SWITCHING BETWEEN CORRESPONDING TRACKS IN A DATA HANDLING DEVICE

FIELD OF THE INVENTION

This application relates generally to head switching and more particularly to electromechanical data handling devices.

BACKGROUND OF THE INVENTION

Computers and other data handling systems have a variety of types of data storage. One common place for storing very large amounts of data inexpensively is in a disc drive. The most basic parts of a disc drive are the housing, the rotatable data storage disc(s), the actuator assembly that moves a head to various locations over each disc, and electrical circuitry that is used to transmit data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support each head over a respective disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the heads) can be positioned over any radial location along the rotating disc surface.

The head is typically placed on a small ceramic block, also referred to as a slider, that is aerodynamically designed so that it flies over the disc. The slider is passed over the disc adjacent a data surface. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Heads, in the form of read/write heads attached to the sliders, located on both sides of the storage disc, read and write information on the storage discs when the heads are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. To write to or read from different tracks, the read/write head is moved radially across the tracks to a selected target track. The data is often divided between several different tracks. While most storage discs utilize multiple concentric circular tracks, other discs have tracks forming a continuous spiral on each data surface.

During manufacturing, servo information is encoded on the disc and subsequently used to accurately locate the head. The written servo information is used subsequently to locate the actuator assembly/head head at the required position on the disc surface and hold it very accurately in position during a read or write operation. The servo information is written or encoded onto the disc with a machine commonly referred to as a servo track writer (hereinafter STW). At the time the servo information is written, the disc drive is typically at the "head disc assembly" (hereinafter HDA) stage. The HDA includes most of the mechanical drive components but does not typically include all the drive electronics. During the track writing process, the STW precisely locates the heads relative to the disc surfaces and writes the servo information thereon.

As demand for higher capacity drives grows, manufacturers are constantly seeking to increase drive capacity while keeping costs and cycle times low. Today, ordinary STW technology is often too limited in production volume to meet increasing market demand and stringent cost reduction targets. To address this issue, Prewritten-Servo-Patterns (PSP) are presently a promising technology. For example, in the field of MDW (Multi-Disc Writer) technology, a special disc-writing machine is applied to write servo tracks on multiple discs at a time, with the multiple-head support of the MDW machine. The written discs are then built into the drives. The main advantage of PSP technology is its ability to reduce valuable factory clean room space and cycle time through the servo track writing on several discs on a single machine, simultaneously. As such, the cost savings are estimated to be significant over ordinary non-PSP. Since the PSP machines are built with high precision specifications, the track squeeze severity on high TPI servo system can be reduced. For these reasons, PSP technology has been found to be an encouraging alternative solution over ordinary STW technology.

While promising more favorable combinations of throughput and precision, technologies like PSP and self-servowriting have caused a host of other issues that component manufacturers have yet to address. Such devices often have novel and unaccounted-for design features such as surfaces that each have track sets that are centered about a different axis. This typically results in a radially-dependent track incongruity between data surfaces. Performing a head-switch between corresponding tracks on different surfaces (i.e. within a "cylinder") is much more burdensome where such an incongruity exists. Accordingly, what is needed is an apparatus and method for performing such headswitches more efficiently.

SUMMARY OF THE INVENTION

At least some tracks are logically mapped so that tracks on different data surfaces correspond with one another, the correspondence defined by the mapping so as to shorten an average headswitch seek. In a first embodiment, a method, a logical track mapping of first and second non-coaxial track sets is defined so as to optimize a headswitch seek within each of many intermediate logical cylinders identified in the mapping.

In a second, alternative method embodiment, a logical track mapping is executed so that a first logical track X on a first data surface logically spans a second logical track X radially on a second data surface and so that a nominal track width is at least twice as wide as a logical offset from a mean radius of the second logical track X to a mean radius of the first logical track X.

In a third method embodiment, one of the methods mentioned above includes a step of determining a preliminary inter-set offset that is independent of any data taken while urging the actuator against a crash stop. A preliminary mapping is computed based on an arithmetic combination of several measurements taken while maintaining a given position. Then the preliminary mapping is used to take several additional readings from which the logical track mapping is derived.

In a fourth embodiment, one of the above methods further includes a step of empirically identifying an outermost usable track that is in one of the track sets by a stop criterion. The eligible criteria include detecting that a bias current threshold has been crossed, that a plurality of consecutively-numbered tracks are not fully readable, or that a predetermined pre-written track number has been read. The mapping includes at least one first cylinder offset (FCO) value partly based on a padding value that is partly based on a thermal variation specification.

In a fifth embodiment, one of the above methods also includes a step of defining the mapping so that a first track is adjacent to the first track set, so that a second track is adjacent to the second set, so that the first and second tracks are within a predetermined logical cylinder having a sub-optimal headswitch seek, and so that the first and second tracks logically overlap.

In a sixth embodiment, one of the above methods also includes a step of storing logical-to-physical track offset for each data surface into a nonvolatile storage location. These offset values essentially define the device-specific calibration values of the mapping.

In a seventh embodiment, one of the above methods also includes a step of installing onto a base pre-written discs so that a first disc contains the first track set which has a first central axis, so that a second disc contains the second track set which has a second central axis, and so that the first and second central axes are parallel and offset by several times more than a nominal track width. A crash stop is also affixed to the base so that an actuator can contact the crash stop while at least one head supported by the actuator is not over any track, and so that the actuator can move away from the crash stop so as to access one of the track sets.

In an eighth embodiment, one of the above methods also includes a step of using the mapping in a normal data storage operating mode. A first portion of a file is stored just before a headswitch operation and a second portion of the file is stored just after the headswitch operation.

An alternative embodiment includes a manufacturing station configured to perform one of the above-mentioned methods automatically. It optionally includes a device-specific controller configured to use the calibration value in a normal operating mode.

In another alternative embodiment of the present invention, also an apparatus, there are a plurality of track sets and a data storage element. The track sets are nominally non-coplanar and substantially non-coaxial. The storage element contains a first calibration value of a logical track mapping, the calibration value selected so as to optimize a same-cylinder headswitch seek between the track sets.

Another alternative apparatus embodiment further includes a rotary actuator having a fixed range of motion. Crash stops define each end of the actuator's range of motion. The actuator supports several heads, each of the heads able to access a respective data surface, each of the data surfaces containing one of the track sets.

Yet another alternative embodiment of the present invention is one of the apparatuses above, in which the storage element contains calibration values of the logical track mapping. The calibration values are selected so that a predetermined cylinder X includes a "left" track in the first set that logically overlaps a "right" track in the second set, the left track not being optimized for use with the right track.

Examples of the above-mentioned embodiments are shown and described in detail below. Additional features and benefits will become apparent upon reviewing the following figures and their accompanying description.

DETAILED DESCRIPTION

Figure 1:
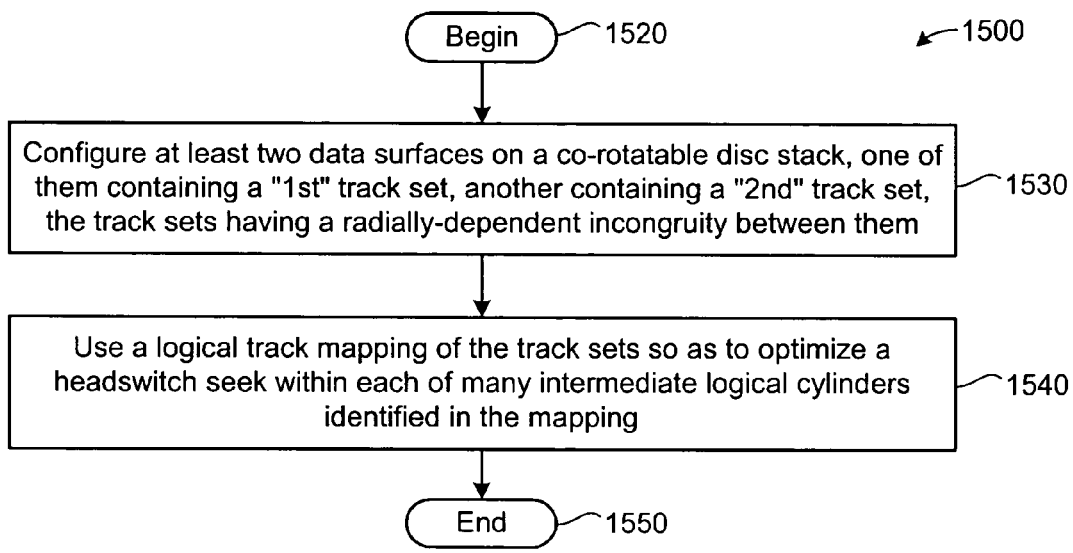
FIG. 1 shows a method in accordance with embodiments of the present invention.

Although the examples below show more tan enough detail to allow those skilled in the art to practice embodiments of the present invention, subject matter regarded as the embodiments of the invention is broader than any single example below. The scope of the present embodiments is distinctly defined, however, in the claims at the end of this document.

To avoid needless distractions from the essence of the present embodiments, like-numbered reference numerals appearing in a later figure generally refer to the same elements as those in an earlier figure. Also, numerous aspects of basic engineering and of positioning technologies that are not a part of the present embodiments (or are well known in the art) are omitted for brevity. For example, this document does not articulate detailed and diverse methods for writing a servo sector. Neither does it include implementation decisions such as what kind of error correction codes to use or what the physical track width distribution will be. Specific techniques for constructing disc stacks are likewise omitted, typically being a matter of design choice to those of ordinary skill in that field of technology.

Definitions and clarifications of certain terms are provided in conjunction with the descriptions below, all consistent with common usage in the art but some described with greater specificity. A "radial" direction is one that is closer to a strictly radial direction than to a tangential direction. A "seek" is a controlled movement of a head in a radial direction between circumferential tracks, such as by rotating a head-carrying actuator about its axis. A "headswitch" is an operation by which a new head is activated and made to follow a track that corresponds with a recently followed track (i.e. in the same cylinder). A "headswitch seek" is a seek that is performed as part of a headswitch. Headswitch seeks are generally needed when the source and target tracks within a given logical cylinder (i.e. like-numbered tracks) cannot both be followed simultaneously. A "logical cylinder" is a set of annular tracks that correspond with one another so that each of them is accessible by a corresponding head, the tracks arranged generally as one annular track parallel with another.

A "mapping" is a numerical translation system that operates at least within a given range of values to convert between two types of track identifiers. One type of mapping converts "physical" track numbers (encoded onto the tracks) to or from "logical" track numbers, for example. A pair of tracks in a logical cylinder are "optimized" for use with each other if each is a "best choice" to share a logical cylinder number with the other, minimizing an average headswitch seek distance between them. A logical cylinder is "optimized" if all of its tracks are in such a pair of tracks and logically overlap one another. Two tracks in a cylinder "logically overlap" if one head on the actuator can pass close enough to read part of one of the tracks while another of the heads follows the other track.

Turning now to FIG. 1, there is shown a method 1500 of the present embodiments including steps 1520 through 1550. Data surfaces are configured 1530 on a co-rotatable disc stack, each data surface having a track set the track sets having a radially-dependent incongruity between them. To ensure that this incongruity is kept small enough, a logical track mapping is used 1540 that optimizes a headswitch seek within each of many intermediate logical cylinders identified in the mapping. A track mapping "optimizes" a headswitch seek between a first surface and a given track on a second surface if no track on the first surface would result in a shorter average seek size when switching between the first and second surfaces' heads.

Figure 2:
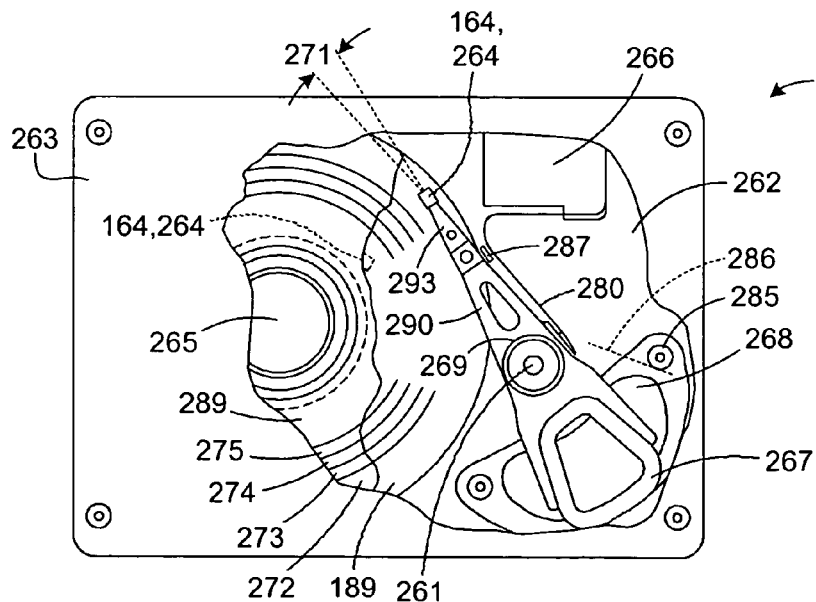
FIG. 2 shows a data handling system in accordance with embodiments of the present invention, to scale.

Turning now to FIG. 2, there is shown a "top view" of a data handling system 260 configured to perform a method as described with reference to FIG. 1, 8, or 9. (Relational terms like "top view" are arbitrary here, in that data handling systems like 260 can generally operate in any orientation.) System 260 includes "top" cover 263 that cooperates with base 262 to form a sealed chamber. Components supported in the chamber include a spindle motor 265 which rotates a stack comprising one or more data storage discs 189,289 at hundreds or thousands of revolutions per minute. Information is written to and read from data surfaces on the disc(s) 189,289 through the use of an actuator assembly 261, which rotates during a seek operation about a bearing shaft assembly 269. Actuator assembly 261 includes one or more actuator arms 290 which extend above and below each of the disc(s) 189,289, with one or more flexures 293 extending from each of the actuator arms. Mounted at the distal end of each of the flexures is a head 164,264 that can fly in close proximity adjacent the corresponding data surface of an associated disc 189,289.

Servo and user data travels through a selected one of the heads 164, 264 and flex cable 280 to control circuitry on controller board 266. (Controller board 266 is configured to perform a method of the present embodiments shown in FIG. 1, FIG. 7 or FIG. 8.) Flex cable 280 maintains an electrical connection by flexing as each head 164, 264 seeks along its pat between tacks on disc(s) 189, 289. During a seek operation, the overall track position of heads 164, 264 is controlled through the use of a voice coil motor (VCM), which typically includes a coil 267 fixedly attached to actuator assembly 261, as well as one or more permanent magnets 268 which establish a magnetic field in which coil 267 is immersed.

The controlled application of current to coil 267 causes magnetic interaction between permanent magnets 268 and coil 267 so that coil 267 moves. As coil 267 moves, actuator assembly 261 pivots about bearing shaft assembly 269 and each of the heads 164,264 is caused to move across the respective surface of the disc(s) 189,289 between the inner diameter and outer diameter of the disc(s) 189,289. The outer diameter is bounded by a position at which one or more arms 290 of assembly 261 engage crash stop 287, which is rigidly affixed to base 262 so as to prevent heads 164,264 from sliding off their respective data surfaces. The inner diameter is similarly bounded by a position at which actuator assembly 261 engages crash stop 285 rigidly supported by base 262. Position 286 shows, with dashed lines, where actuator 261 will be when its heads 164,264 are at the inner diameter. As shown, actuator 261 positions heads 164,264 much closer to their respective outer diameters, causing an outward skew angle 271 of actuator 261 relative to the tracks.

When actuator 261 is near the middle of its range, at a skew position corresponding to a skew angle near zero degrees, heads 164,264 will each be within a range 274 of consecutively-numbered "optimized cylinders." To illustrate this suppose that head 164 is following a track having a logical number of "X1" and a physical location within range 274. Suppose further that the tracks accessible to head 264 do not share a central axis with those accessible to head 164. Therefore head 264 will not generally remain aligned with any single track as head 164 follows track X. However, there will be some track accessible to head 264 that has an average radial misalignment with head 264 that is minimal, compared with a similarly-measured misalignment from all of the other tracks accessible to head 264. This is an "optimal" track for logical alignment with the track X followed by head 164. Head switches between these two tracks will, on average, result in very short seeks. Both of these tracks are therefore assigned to a common cylinder X.

The "logically optimized" range 274 of FIG. 2 contains thousands of consecutively-numbered and physically adjacent cylinders, range 274 including at least 0.1% of a nominal number of physical tracks that exist on a given major data surface of any of the discs 189, 289. Each of the tracks in both disc 189 and range 274 has a like-numbered track that is in both disc 289 and range 274, the like-numbered tracks being optimally aligned with one another. Preferably range 274 includes hundreds or thousands of tracks in the outer half of the physical tracks on each of the data surfaces.

Adjacent to range 274 are two contiguous ranges 273,275 of cylinders each containing "logically overlapping" tracks on discs 189&289. Each of these ranges 273,275 also contains thousands of consecutively-numbered and physically adjacent cylinders, at least 1% of a nominal number of physical tracks that exist on a given major data surface of any of the discs 189, 289. Each of the tracks in both disc 189 and range 273 has a like-numbered track that is in both disc 289 and range 273, for example, the like-numbered tracks aligned well enough to overlap each other logically, but not logically optimized.

Outside range 273 is a contiguous range 272 of cylinders each containing thousands of "logically non-overlapping" tracks on discs 189&289. At least 1% of a nominal number of physical tracks that exist on a given major data surface of any of the discs 189, 289 is in such a range. Each of the tracks in both disc 189 and range 272 has a like-numbered track that is in both disc 289 and range 272, for example, the like-numbered tracks not aligned well enough to overlap each other logically.

To appreciate fully the advantages of the configuration shown in FIG. 2, it should be emphasized that difficulties have arisen in the cost-effective manufacture of data handling systems of this general type. Many of the difficulties relate to exceedingly high track pitch and precise timing requirements. For example, servo-writing many thousands of finely-pitched tracks takes a lot longer than servo-writing at lower densities. For this reason some skilled in the art are looking to "Pre-written Servo Pattern" (PSP) systems or to other systems that can introduce a substantial component of Coherent Repeatable Run-Out (CRRO). Unfortunately such systems can introduce significant offsets between like-numbered tracks not previously encountered.

Figure 3:
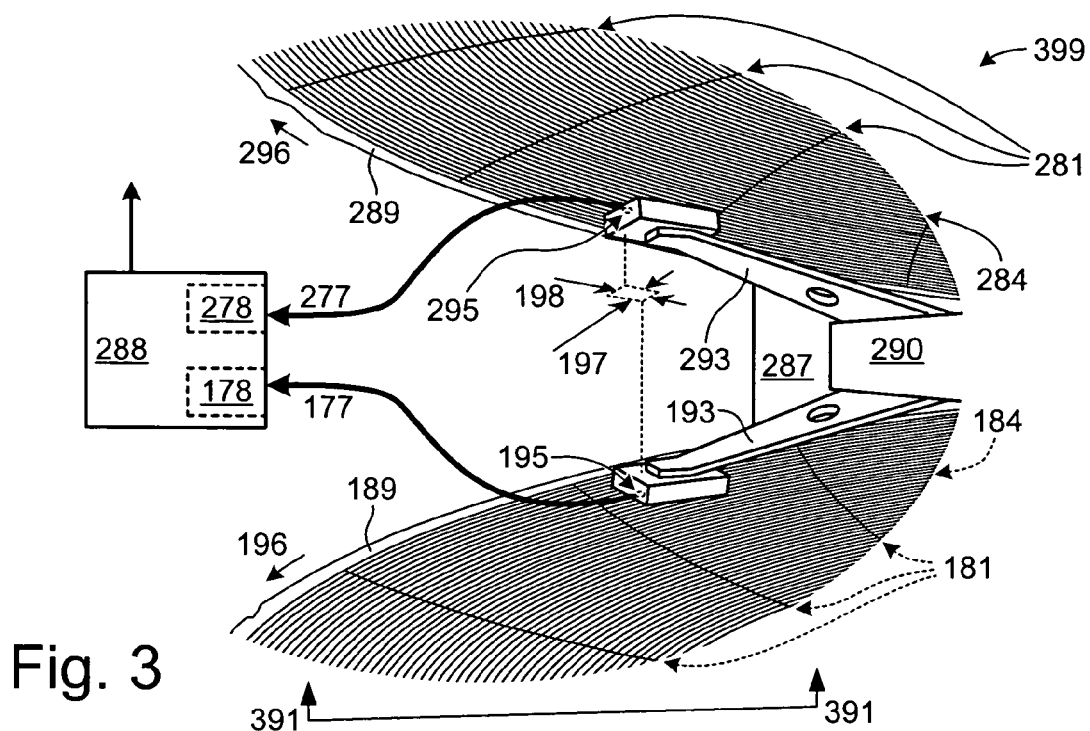
FIG. 3 shows a close-up "side view" of the system of FIG. 2.

To illustrate this FIG. 3 shows a close-up "side view" 399 from between two of the discs 189,289 of system 260 (not to scale). As FIG. 3 shows, rotary actuator arm 290 supports read/write heads 195,295, respectively positioned to access outer tracks 184 of disc 189 and/or from outer tracks 284 of disc 289. In fact, actuator arm 290 is urged (biased) against crash stop 287 so that heads 164,264 are each at the outer diameters of the respective data surfaces. The pitch between tracks 184,284 is actually exceedingly fine, orders of magnitude denser than those shown. Read/write heads 195,295 are supported by arm 290 via flexures 193,293.

Discs 189,289 rotate at a controlled speed about a common axis as shown by respective movement indicators 196,296. Head 195 leads head 295 slightly, as shown by circumferential offset 198. Radial offset 197 similarly shows that head 195 is farther from the discs' axis of rotation than head 295. Head 195 generates an output 177 that is received into buffer 178 of processor 288, which is implemented in control circuitry on controller board 266 of FIG. 2. Head 295 similarly generates an output 277 that is received into buffer 278. (Heads 195,295 transmit outputs 177,277 via a preamplifier circuit supported on the actuator, not shown.)

An important component of head outputs 177,277 is position information found in servo wedges 181,281 on respective surfaces. (In FIG. 3, note that servo wedges 181 will typically not be encountered by head 195 at the same time that servo wedges 281 are encountered by head 295.) Most or all of the position information that enables heads 195,295 stay on their respective tracks is found in marks within the servo wedges. It should be understood that servo "wedges" are so named because they ordinarily taper narrower near the inner tracks of each surface, toward the discs' centers. Also, the wedges are typically not perfectly radial. They each curve in a generally circular arc so that an actuator rotation will not significantly alter the time at which a given servo wedge will be encountered by a corresponding head. Finally, it should be noted that "bottom view" 391 of FIG. 3 shows a perspective from which the plot of FIG. 4 is derived.

Figure 4:
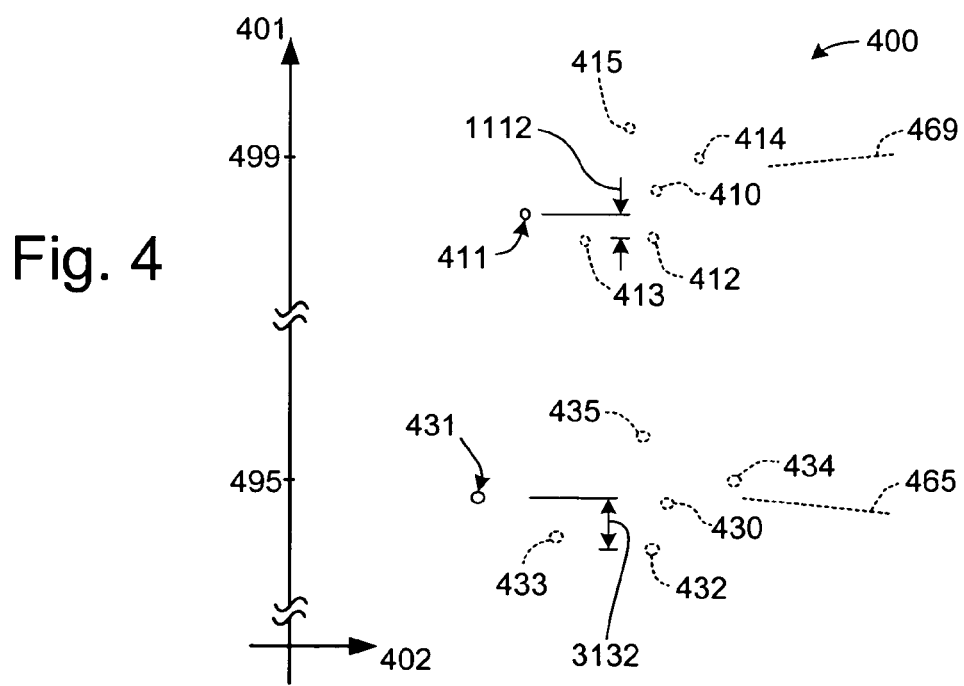
FIG. 4 shows a plot of a radial position versus circumferential position, illustrating how the heads' relative positions in the system of FIG. 2 can skew.

FIG. 4 shows a plot 400 of radial position 401 versus circumferential position 402. Position 495 indicates the actuator's innermost position, where each of the heads is at its respective "inner diameter." Position 499 indicates the actuator's outermost position, where each of the heads is at its respective "outer diameter." Head positions 410,411,412, 413,414,415 show exact relative locations of the several heads at one end of the actuator's range of motion. Note that manufacturing variations have caused radial and circumferential offsets among the heads so as to create a first constellation of head positions mounted onto a rotary actuator at an outward-most skew angle 469.

Recall from FIG. 3 that Head #1 (i.e. 195) is ahead of and outward from Head #2 (i.e. 295). In the upper part of FIG. 4, these same two heads are shown in position 411 and in position 412, respectively. Head #1's outermost position 411 is similarly ahead of and outward from Head #2's outermost position 412. At this position, the heads 195&295 have a radial offset component 1112 that is the smallest T1-T2 radial offset 197 available within the actuator's range of motion.

Suppose the rotary actuator shifts clockwise relative to FIG. 4 so that the actuator is at an inward-most skew angle 465 and so that the heads are in new positions 430,431,432, 433,434,435. As one manifestation of this clockwise shift, note that Head #0 is closer than Head #1 to the disc center (i.e. lower, on FIG. 4) in inner position 495. This was not the case at outer position 499, at which Head #0's position 410 is further out than Head #1's position 411.

Apart from the clockwise shift just described, the "inward seek" results in another interesting shift. Recall that ordinary servo wedges each taper so that they are narrower in inner ranges and wider in outer ranges. Referring again to FIG. 4, it should be noted that head-to-head longitudinal offsets like 198 will not ordinarily taper narrower (in terms of distance) during an inward seek. Thus when viewed as a function of angular position 402, the constellation of head positions 430-435 will dilate horizontally during an inward seek. (Note that disc rotation speed is essentially constant for present purposes, so that angular position 402 is essentially equivalent to a time scale.) This dilation is visible in plot 400 in that the constellation of head positions 430-435 is horizontally stretched by more than 20%, relative to the corresponding constellation of head positions 410-415 at the outer diameter.

After the inward seek, Heads #1 and #2 have a radial offset component 3132 that is the worst-case H1-H2 radial offset 197 that occurs within the actuator's range of motion. Although plot 400 is only roughly to scale it should be noted that radial offset component 3132 actually is more than twice radial component 1112, as shown. The difference between these offsets 1112&3132 is more than an order of magnitude larger than a nominal track width. Radial offset 197 is therefore an example of a significant radially-dependent incongruity.

Figure 5:
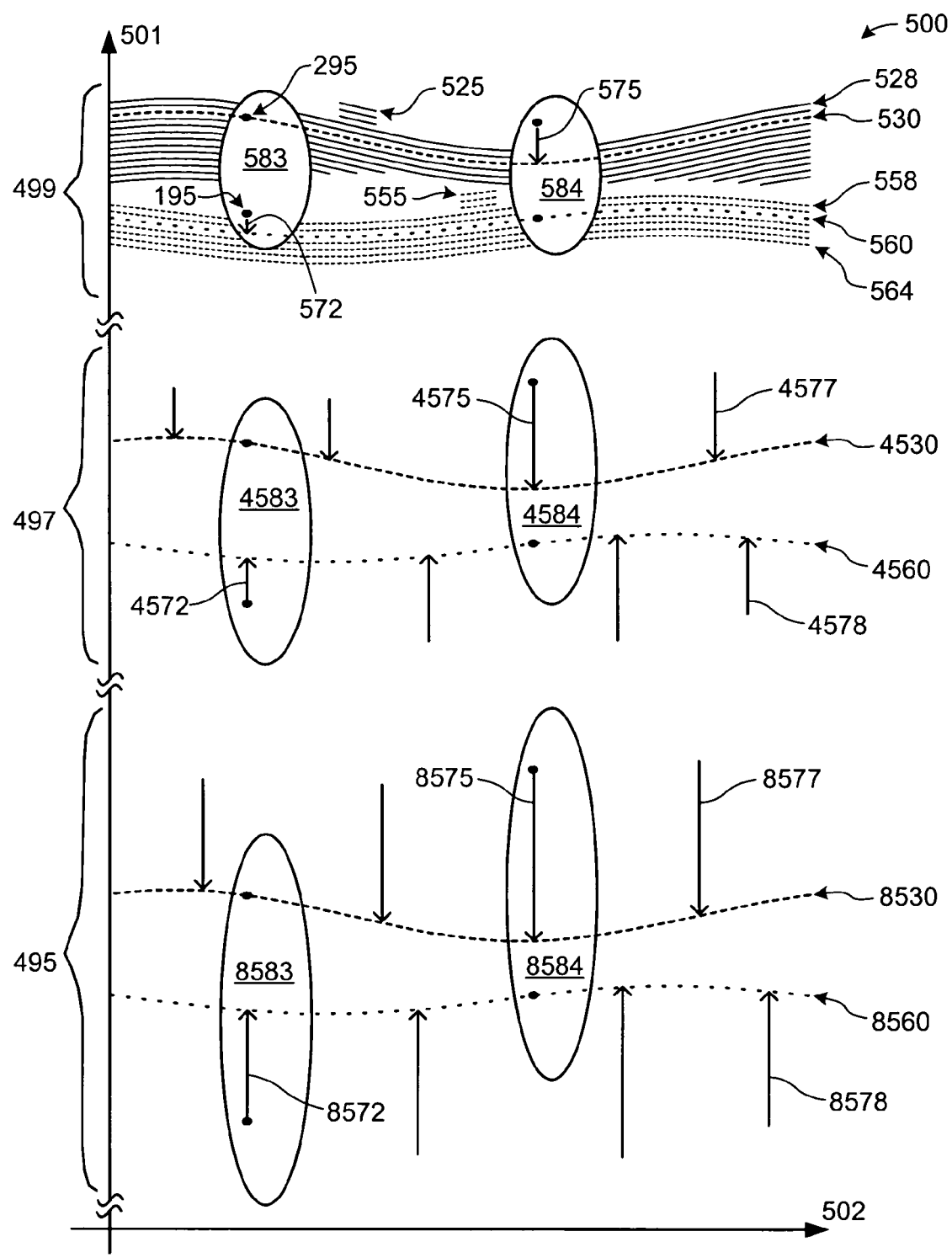
FIG. 5 shows another plot of a radial position versus circumferential position for the system of FIG. 2, illustrating how headswitch seeks can depend on radial position.

FIG. 5 shows another plot 500 of a radial position 501 versus circumferential position 502 for the system of FIG. 2, illustrating how such an incongruity can impair system performance. An outermost position 499 is initially discussed. A position 583 of actuator assembly 261 is shown schematically, including head 195&295 as shown in FIG. 3. Head 295 is following track 530 as shown at position 583, at which a headswitch is begun to activate head 195. Suppose that an evaluation is being made of whether track 560 is suitable for assignment to a logical cylinder to be shared with track 530. (It should be understood that only head 195 can access track 560, and only head 295 can access track 530.) Due in part to an axial misalignment between tracks 530 and 560, immediately following the activation of head 195, head 195 is not initially on track. In fact, a short seek 572 of a couple of tracks is required. Similarly when performing a headswitch back at a later time, at position 584, an associated seek 575 of several tracks must be performed. It can be seen that the average length of headswitch seeks between tracks 530 and 560 is nearly optimal, and that tracks 530 and 560 overlap logically.

One way to obtain a mapping that is optimal near the outermost tracks is to seek outward using each head until an outermost fully follow-able track 528,558 is found on each data surface. Note that this will require that the outermost track is followed around an entire circumference, so as to exclude any partially-followable tracks 525,555. Then a thermal variation padding value is applied to each (two tracks, in the example shown) to determine a "first track" of each surface. Good headswitch seek performance can be achieved at the outermost region by assigning both of these "first tracks" to logical cylinder zero. Better overall performance can be achieved, however, in certain configurations in which a larger guardband is used on one surface than that used on another (for example, if track 564 is assigned to logical cylinder zero).

In a radially intermediate position 497 somewhere near the middle of each discs' region of useable tracks, it can be seen that headswitch performance has dropped somewhat. At position 4583, a headswitch from head 295 to head 195 has a seek 4572 (outward) of several nominal track widths. In fact, all headswitches between tracks 4530 & 4560 include seeks of several nominal track widths. Several outward seeks 4572,4578 are shown for switching from track 4530 (head 295) to track 4560 (head 195). Several inward seeks 4575,4577 are likewise shown for switching from track 4560 (head 195) to track 4530 (head 295). In either case, it is clear that headswitches between tracks 4530&4560 will not perform as well because these tracks do not overlap logically.

In an innermost position 495, performance has become far worse still. Several outward seeks 8572,8578 are shown for switching from track 8530 (head 295) to track 8560 (head 195). Several inward seeks 8575,8577 are likewise shown for switching from track 8560 (head 195) to track 8530 (head 295). None of these seeks upward or downward is within an order of magnitude of a nominal track width.

In substantial part, this deterioration results from the same incongruity that enlarged inter-head radial offset 197 (FIG. 3) from a minimum value 1112 (FIG. 4) to a maximum value 3132 (FIG. 4). In the schematic of FIG. 5, this incongruity is shown graphically by the vertical distortion of the actuator assembly growing to 4583,4584 and then to 8583,8584 as the actuator assembly moves radially inward.

Figure 6:
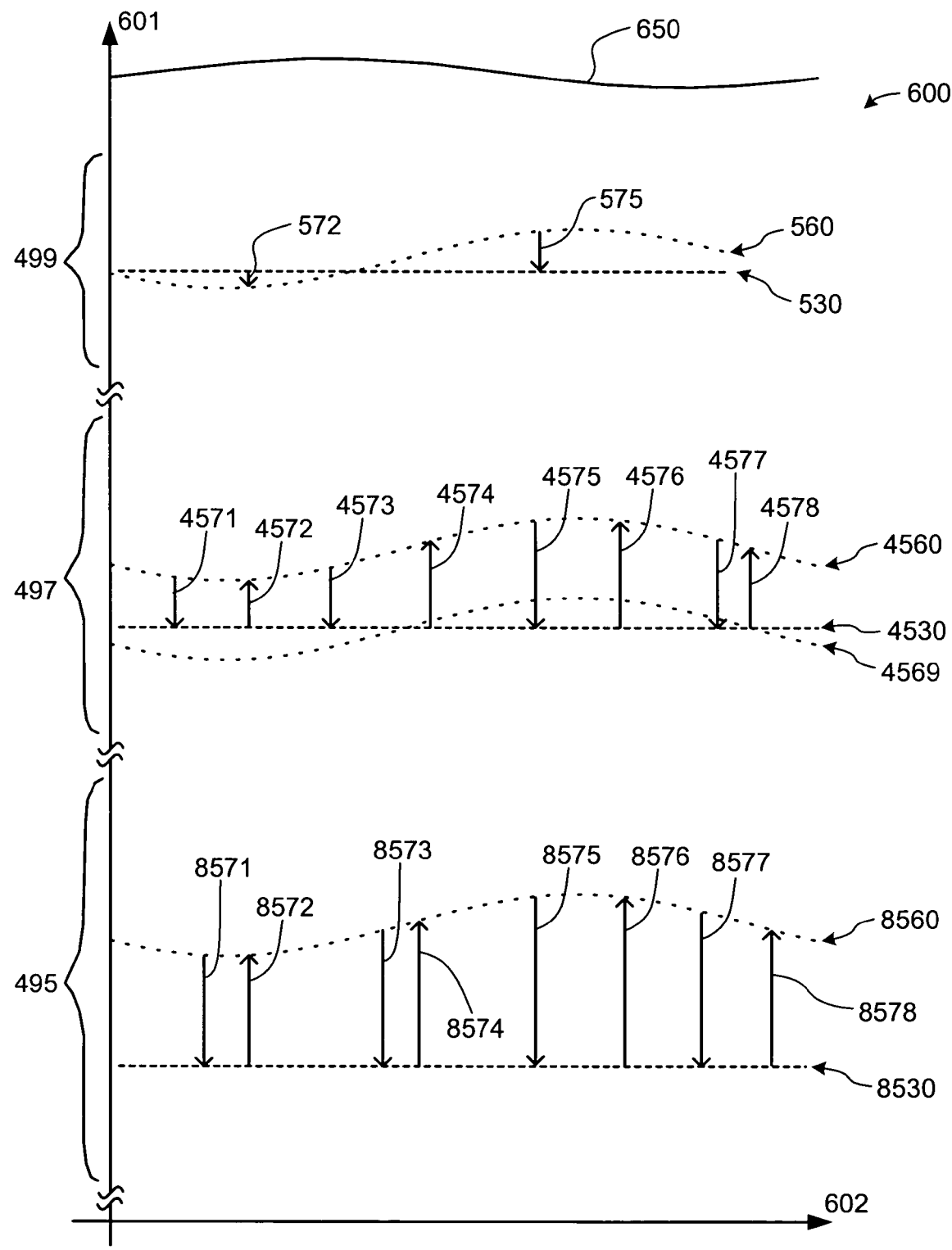
FIG. 6 shows yet another plot of a radial position (in a scale of track numbers) versus circumferential position for the system of FIG. 2, illustrating how a logical track mapping can affect system performance.

FIG. 6 shows a plot 600 very similar to plot 500 of FIG. 5. Rather than plotting ordinary radial distance (such as 501) versus circumferential distance, though, track number position 601 (relative to a surface of disc 189) is plotted versus circumferential position 602. On this scale, tracks 530, 4530 and 8530 are flat lines. On a surface of disc 289 are three physical tracks 560, 4560 and 8560 at respective outermost, intermediate, and innermost positions 499,497,495 each shared with respective tracks 530, 4530 and 8530. All of the same seeks 572,575,4572,4575,4577,4578,8572,8575,8577, 8578 shown in FIG. 5 are also shown, essentially the same size. Additional seeks 4571,4573,4574,4576,8571,8573, 8574,8576 are also shown to demonstrate that the area between each pair of plotted tracks graphically corresponds to the average seek size between that pair of tracks.

One technique for assigning tracks to a common cylinder includes a step of urging an actuator against a crash stop so as to follow a path (such as 650) having a uniform absolate radius. This is done to identify an outermost "partially follow-able" track that cannot be fully followed due to interference by the crash stop. This is used to find the outermost filly follow-able track 530, 560 on each surface. Assigning track pairs 530 & 560, 4530 & 4560 and 8530 & 8560 each to a common cylinder creates a "best case" seek size at the outermost position 499, a close-to-typical seek size at the intermediate position 497, and a worst case seek size at the innermost position 495. Even though hundreds or thousands of the outermost tracks will each correspond with a track wit which it logically overlaps, this configuration leaves room for improvement. For example, suppose that all of the physical tacks on disc 289 are added to a constant selected so that a logically optimal track 4569 corresponds with track 4530. This results in improved performance at the intermediate and innermost positions 497, 495 reducing the average headswitch seek length for each pair of tracks near and between these positions. This improves overall headswitch performance by reducing an overall headswitch seek length (i.e. averaged across the entire pair of data surfaces).

Figure 7:
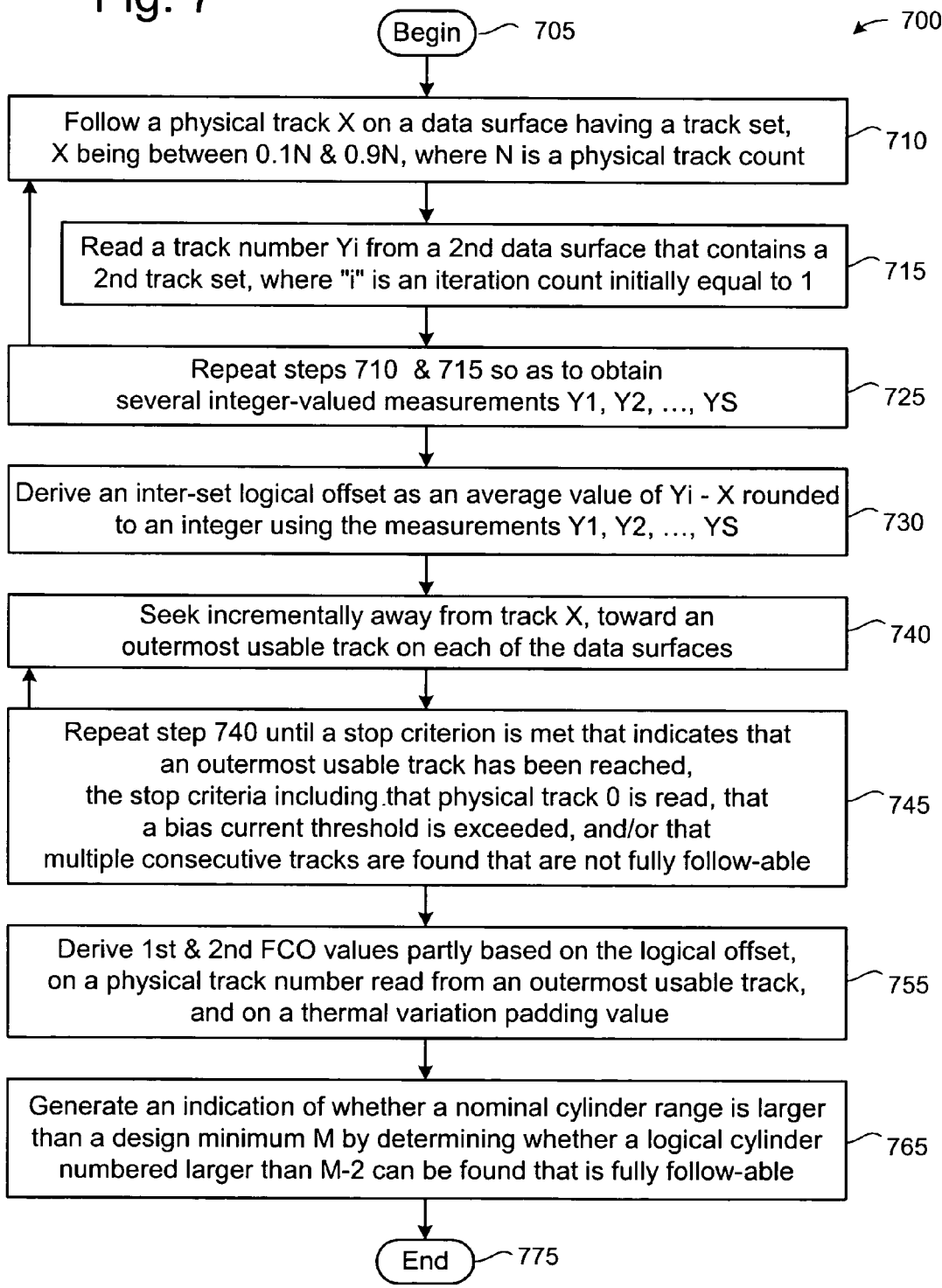
FIG. 7 shows another method in accordance with embodiments of the present invention.

FIG. 7 shows a method 700 that includes steps 705 through 775. Method 700 uses a logical track mapping of first and second non-coaxial track sets so as to optimize a headswitch seek within each of many intermediate logical cylinders identified in the mapping. At first an actuator follows a physical test track X on a first data surface that contains the first track set 710, track X being between 0.1N and 0.9N, where N is a physical track count of the first data surface. Simultaneously a track number $Y_i$ is read from a second data surface that contains the second track set 715, where i is an iteration count initially equal to 1. Steps 710&715 are repeated several more times 725 so as to obtain several measurements $Y_1, Y_2, \ldots, Y_s$. A preliminary inter-set logical offset ($O_L$) is then derived as an average value of $Y_i$-X rounded to an integer value 730, using the several measurements $Y_1, Y_2, \ldots, Y_s$. To minimize the need for precision in crash stop placement, the preliminary inter-set offset $O_L$ is optionally determined without reference to any data taken while urging the actuator against a crash stop.

This offset $O_L$ is then used while seeking incrementally away from track X toward an outermost usable track on one of the data surfaces 740. The incremental seeking step 740 can be performed quickly by using a step-down approach, first stepping in coarse increments of hundreds of tracks until a stop criterion is met, then backing up to step in single-track increments. Step 740 is repeated until a predetermined stop criterion is met that indicates that the outermost usable track on each of the two surfaces has been reached 745. The stop criterion can preferably be any of several: e.g. that physical track 0 is read, that a bias current threshold is exceeded, or that multiple consecutive tracks are encountered that are not fully follow-able. First and second first cylinder offset (FCO) values are derived partly based on the logical offset $O_L$, on a physical track number read from the outermost usable track, and on a thermal variation padding value 755. Then at step 765, the device is verified to function at a logical cylinder numbered larger than M−2 as a robust, basic indication of data storage capacity.

Figure 8:
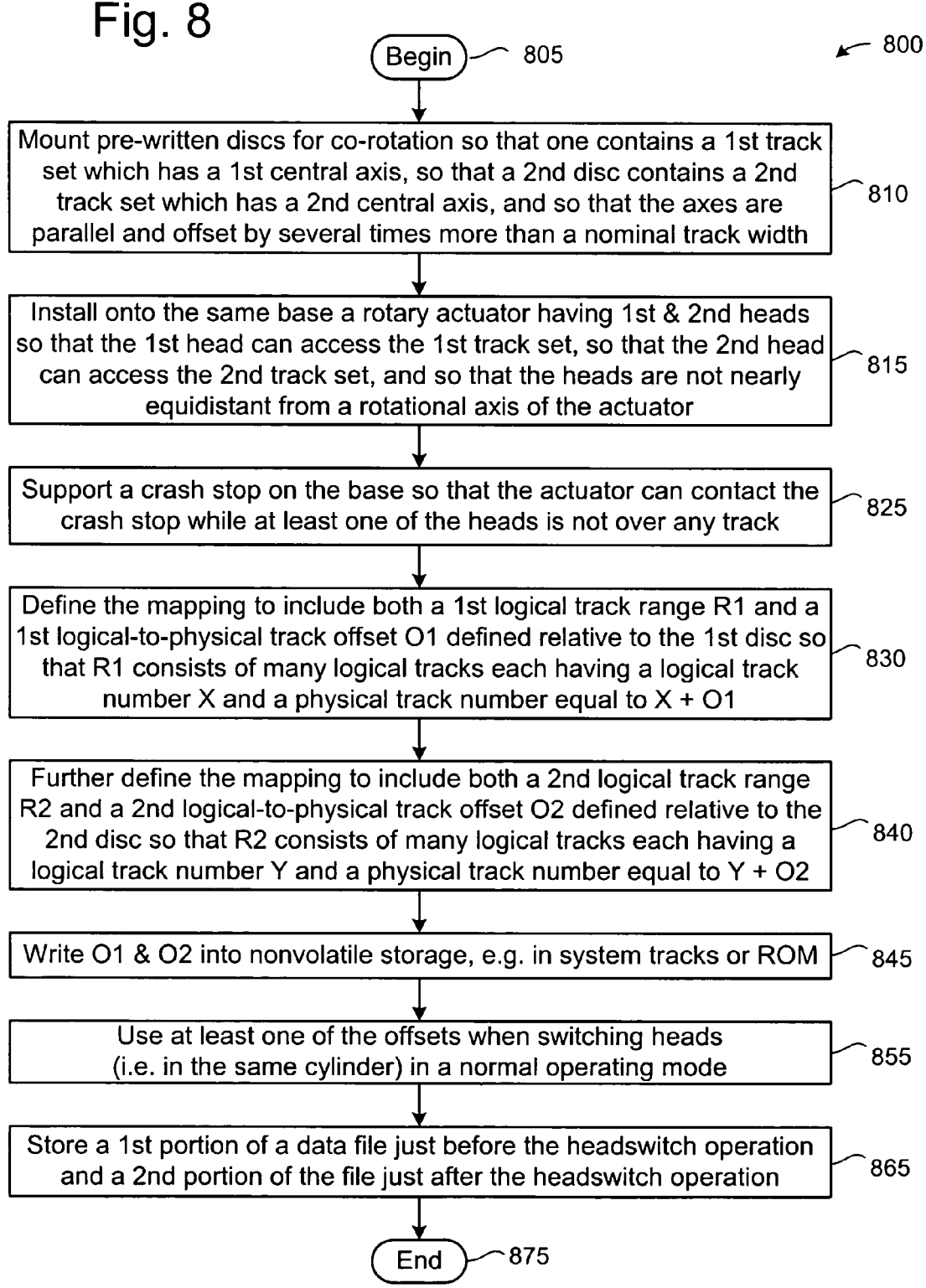
FIG. 8 shows yet another method in accordance with embodiments of the present invention.

FIG. 8 shows a method 800 that includes steps 805 through 875, optionally used in conjunction wit method 700 of FIG. 7. Method 800 uses a logical track mapping of first and second non-coaxial track sets so as to improve a headswitch seek within each of the logical cylinders identified in the mapping.

At a preliminary step first and second pre-written discs are installed 810 so that the first disc contains the first track set which has a first central axis, so that the second disc contains the second track set which has a second central axis, and so that the first and second central axes are parallel and offset by several times more than a nominal track width. Onto the same base a rotary actuator is installed 815. The actuator is configured so that a first head can access the first track set, so that a second head can access the second track set, and so that the heads are not equidistant from a rotational axis of the actuator. A crash stop is positioned so that the actuator can contact the crash stop while at least one of the heads is not over any track 825.

At step 830, the mapping is defined to include both a first logical track range $R_1$ and a first logical-to-physical track offset $O_1$. The mapping is defined relative to the first disc so that $R_1$ consists of many logical tracks each having a logical track number X and a physical track number equal to $X+O_1$. The mapping is further defined 840 to include both a second logical track range $R_2$ and a second logical-to-physical track offset $O_2$. These are designated relative to the second disc so that $R_2$ consists of many logical tracks each having a logical track number Y and a physical track number equal to $Y+O_2$. The logical-to-physical track offsets $O_1$ and $O_2$ are written into a nonvolatile storage location 845 such as in system track on one of the discs, or into a Read-Only Memory. They are thus available for use in a normal operating mode 855, such as when writing a file to two like-numbered tracks 865.

Figure 9:
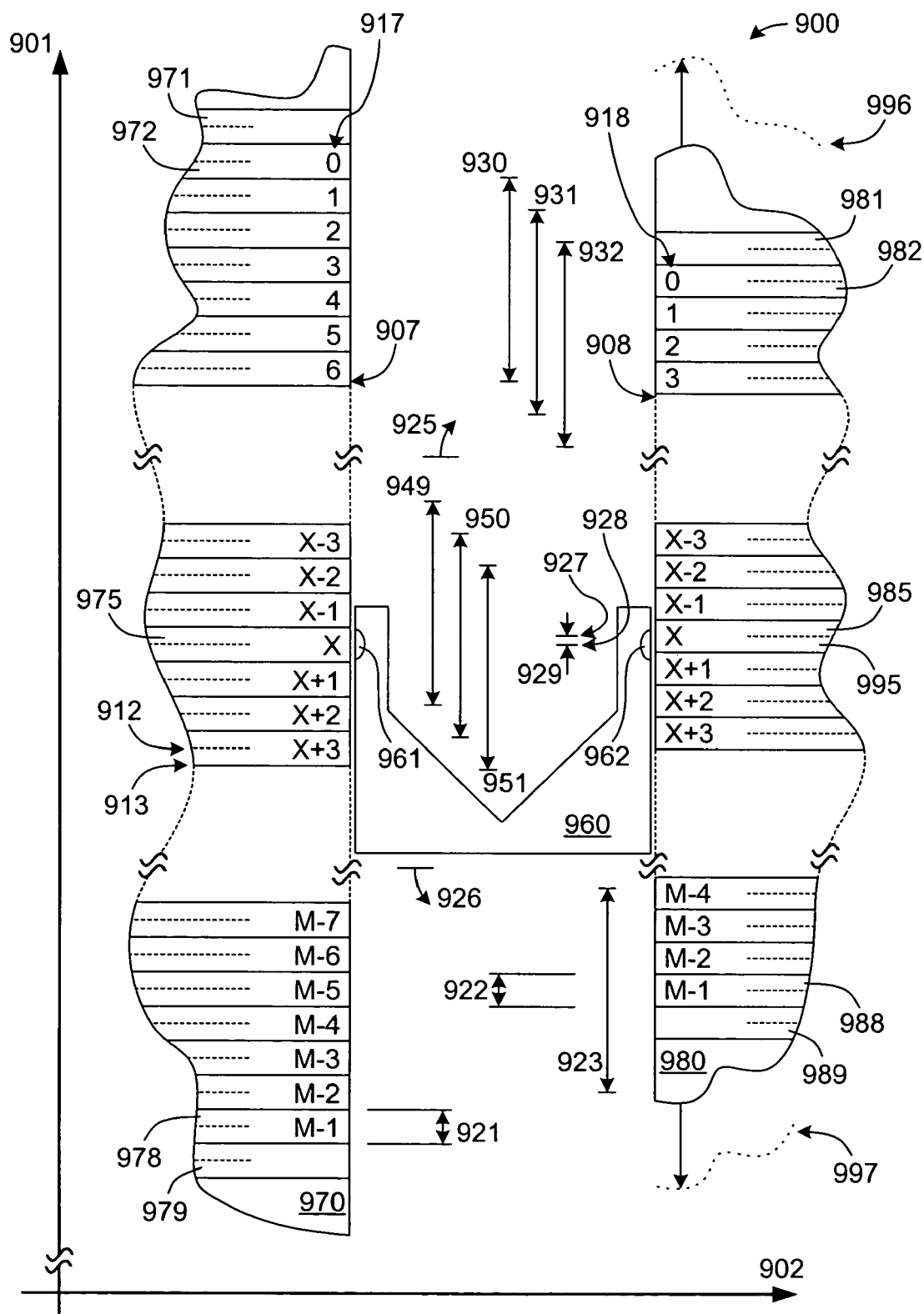
FIG. 9 shows another data handling system in accordance with embodiments of the present invention schematically, illustrating how a logical track mapping can affect system performance.

FIG. 9 shows a detailed schematic of a device 900 that is optionally configured according to methods 700&800 of FIGS. 7&8. Device 900 is optionally implemented as the data handling system 260 of FIG. 2, where heads 961&962 are implemented as heads 164&264, respectively. Relative to "left" disc 970, a logical radial position 901 (in track numbers) is plotted versus "axial" position 902. A large number of physical tracks 971 through 979 and 981 through 989 are shown on each of the designated surfaces 907,908 of discs 970,980. Each of the physical tracks has an effective centerline 912, two boundaries 913, and several instances of a Gray code identifier (not shown). The Gray code is a digital code written onto the track from which a physical track number can readily be determined while seeking or track following. The boundaries 913 define a nominal, typical track width 921 for surface 907 and a nominal, typical track width 922 for surface 908. FIG. 9 shows tracks horizontally on the page, schematically. In reality these tracks are written on data surfaces 907&908, perpendicular to the page.

Head 961 follows intermediate track number "X" (at 975) prior to a headswitch, effectively remaining stationary relative to scale 901. Actuator 960 supports heads 961&962 in an effectively rigid relative position, so that head 962 also remains effectively stationary relative to scale 901. Unfortunately the physical tracks 971-979 of left surface 907 are axially offset from the physical tracks 981-989 of right surface 908 by at least several times more than a nominal track width 921. This is equivalent to saying that the track sets are "substantially non-coaxial," as used in this document. As the discs 970,980 rotate, the position of tracks on surface 908 vary cyclically depending on the discs' rotary position, relative to scale 901. Surface 908 is shown at its average position relative to scale 901, midway between its most extreme positions 996,997.

To understand all of the components of the motion of disc 980 relative to scale 901, it deserves emphasis that heads 961&962 may have (physical) radial misalignments equal to tens or hundreds of tracks widths 921,922. Individual track widths on discs 970,980 may be irregular or have a substantial nominal difference between the discs. And heads 961&962 may have a radially-dependent incongruity because of skew differences like those illustrated above in FIG. 4. These changes would not affect that heads 961&962 are perfectly aligned relative to scale 901, in that these heads are logically aligned by definition. Both share an effective (radial) center position 928 at all times.

The position of disc 980 relative to scale 901 can be affected by actuator arm oscillations, by a microactuator (not shown) on the arm that supports head 962, or by the shape of whichever tracks are nearest head 962.

A large quantity M (i.e. tracks 972 through 978) of the physical tracks on left surface 970 are each assigned a corresponding logical track number 917 according to a logical-to-physical track mapping. The mapping may be implemented as a First Cylinder Offset (FCO), for example, a constant that is added to each physical track number encoded onto surface 970 to obtain the corresponding logical track number 917. In the particular scheme shown, the resulting logical tracks are numbered zero through M−1.

The same quantity M (i.e. tracks 982 through 988) of the physical tracks (i.e. tracks 981 through 989) on surface 908 are each assigned a corresponding logical track number 918, according to the above-mentioned logical-to-physical track mapping. A second constant ($FCO_2$) is determined suitable to be added to each physical track number encoded onto surface 980 to obtain the corresponding logical track number 918.

For an actuator following an intermediate logical cylinder on a "source" data surface, it is desirable to find a logical mapping such that an average headswitch seek will be small. More preferably, like-numbered tracks will overlap logically. Suppose that a consecutive series of many intermediate tracks 975 on data surface 907 are selected for optimization. Preferably the many tracks 975 are selected to include a track X that is between 0.01M and 0.99M, and more preferably a track X tat is between 0.1M and 0.9M. Note that this is possible even if heads 961 & 962 have a huge (physical) radial offset, so that the track X of surface 907 does not physically overlap the track X of surface 908.

By an optimal selection of $FCO_2$ or other suitable mapping that defines logical track numbers 918, a physical track 985 is designated as track number "X." Track 985 is shown with an effective track center 927 at its average radial position, which is assumed to be its midrange position for diagrammatic simplicity. In other words, the mapping is executed so that a "right" logical track X 985 on a right data surface 908 logically spans a "left" logical track X 975 on a left data surface 907. The mapping is also executed so that a nominal track width 922 is at least about twice as wide as a logical offset 929 from a mean radius 928 of the right logical track X to a mean radius 927 of the left logical track X. A logical cylinder 995 number X is partly or wholly defined by assigning a logical track number X to these two tracks 975,985.

As noted above, each of the tracks 981 through 989 on surface 908 has a width that is nominally equal to width 922. Each also has a range bounded by an outermost position of its outer boundary and an innermost position of its inner boundary. For example, tracks X−1, X, and X+1 of surface 908 have respective radial ranges 949,950, and 951 that span the like-numbered tracks on surface 907 as shown.

Referring now to the outermost region 925 of discs 970&980, respective radial ranges 930,931, and 932 are shown in relation to their corresponding tracks numbered 0, 1, and 2 of surface 908. The nominal range of the outermost mapped track 972 of surface 907 is equal to its nominal width 921. From FIG. 9 it is clear that several of the outermost like-numbered logical tracks 972&982 overlap logically. They do not span one another logically, however, unlike those shown near cylinder X (995).

Moving now to an innermost region 926, innermost mapped track 988 has a logical track number of M−1 and a range 923. According to the present embodiments, the mapping is optionally executed so that a track 988 does not logically overlap another track 978 that is like-numbered (e.g. sharing the track number M−1).

In terms of method 800 of FIG. 8, in a normal operating mode, head 961 stores a first portion of a datafile on track X of surface 907 using mapping calibration values $O_1$&$O_2$ retrieved from a system track on data surface 907. (A system track can be found fairly quickly without the calibration values, such as by placing it just outside of logical track zero 972.) The first portion of the datafile is written with the position of actuator 960 as shown in FIG. 9. Then a (same-cylinder) headswitch is performed to activate head 962 and to deactivate head 961. As a part of the headswitch, actuator 960 generally must execute a seek so that head 962 is stably following a like-numbered track of surface 908 (at 985). Because of the present embodiments, throughout the mapped track ranges, this seek will usually be short. After the headswitch, actuator 960 moves in tandem with disc 980 relative to scale 901, and a second portion of the datafile is stored on track X of surface 908.

It is to be understood tat even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present embodiments to the full extent indicated by the broad general meaning of the terms in which the appended claims are expressed. For example, the particular elements may vary depending on the particular position monitoring application while maintaining substantially the same functionality. Although the more detailed embodiments described above relate to track identifier mappings involving simple additions, other applications involving more complex mappings can readily benefit from these teachings without departing from the scope and spirit of the embodiments of the present invention.

Moreover, it will be appreciated by those skilled in the art that the selection of a suitable track identifier mapping scheme involves several trade-offs. The best solution will depend on the application, and except as specified below, no particular solution to this trade-off is of critical importance to the present embodiments. A selection of designs will typically be available and readily derived, depending on the robustness and other performance characteristics required. One of ordinary skill will be able to use the above description to design and implement a variety of methods and devices using suitable track identifier mappings in light of the teachings above, without undue experimentation.

What is claimed is:

1. A method including using a logical track mapping by deriving a first cylinder offset (FCO) scalar between tracks of first and second non-coaxial track sets, respectively, so as to optimize a headswitch seek within each of many intermediate logical cylinders identified in the mapping.

2. The method of claim 1 in which the using step includes steps of:
   determining a preliminary mapping based on an arithmetic combination of several measurements; and
   using the preliminary mapping to take several additional readings from which the logical track mapping is derived.

3. The method of claim 1 in which the using step includes a step of defining the mapping so that a first track is adjacent to the first track set, so that a second track is adjacent to the second set, so that the first and second tracks are within a predetermined logical cylinder having a suboptimal headswitch seek, and so that the first and second tracks logically overlap.

4. The method of claim 1 in which the using step includes a step of using a logical-to-physical track offset.

5. The method of claim 1 in which the using step includes a step of storing a configuration parameter of the mapping into a nonvolatile storage location.

6. The method of claim 1 in which the using step includes a step of storing a first portion of a file just before a headswitch operation and a second portion of the file just after the headswitch operation.

7. The method of claim 1 in which the using step includes a step of positioning a crash stop so tat an actuator can contact the crash stop while at least one head supported by the actuator is not over any track, and so that the actuator can move away from the crash stop so as to access one of the track sets.

8. The method of claim 7 in which the using step includes a step of storing a configuration parameter of the mapping into a nonvolatile storage location.

9. A device comprising:
   a plurality of non-coplanar, substantially non-coaxial tack sets; and
   a storage element containing a first calibration value associated wit a first set of the non-coaxial track sets and a second calibration value associated with a second set of the non-coaxial track sets of a logical track mapping, the calibration values selected so that a predetermined cylinder X includes a track in the first set that logically overlaps a track in the second set as to optimize a same-cylinder headswitch seek between the track sets.

10. The device of claim 9, further comprising a controller configured to use the calibration values in a normal operating mode.

11. The device of claim 9, further comprising a rotary actuator having a fixed range of motion.

12. The device of claim 9, further comprising a rotary actuator supporting several heads, each of the heads able to access a respective data surface, each of the data surfaces containing one of the track sets.

13. The device of claim 9, further comprising a crash stop defining a first end of the actuator's fixed range of motion.

14. A data storage device comprising:
   a transducer disposable in a data storage and retrieval relationship with a storage medium; and
   means for mapping storage tracks of the storage medium to compensate for a non-coaxial storage track condition resulting from radial incongruities associated with the storage medium and the transducer, in order to optimize a required transducer seek when switching between non-coaxial storage tracks across the storage medium.

15. The method of claim 1 wherein the using a logical mapping step is characterized by a logical mapping of the first and second non-coaxial track sets that minimizes the headswitch seek within a predetermined set of the logical cylinders.

16. The method of claim 15 wherein the using a logical mapping step is characterized by the predetermined set being associated with a minimum head skew of a head performing the headswitch seek.

17. The method of claim 15 wherein the using a logical mapping step is characterized by the predetermined set not being disposed within the outermost ten percent of the logical cylinders or the innermost ten percent of the logical cylinders.

* * * * *